US012566083B2

(12) United States Patent
Handerek

(10) Patent No.: US 12,566,083 B2
(45) Date of Patent: Mar. 3, 2026

(54) DISTRIBUTED OPTICAL FIBRE SENSOR

(71) Applicant: VIAVI SOLUTIONS INC., Chandler, AZ (US)

(72) Inventor: Vincent Andrei Handerek, Grays (GB)

(73) Assignee: VIAVI SOLUTIONS INC., Chandler, AZ (US)

( * ) Notice: Subject to any disclaimer, the term of this patent is extended or adjusted under 35 U.S.C. 154(b) by 192 days.

(21) Appl. No.: 18/485,730

(22) Filed: Oct. 12, 2023

(65) Prior Publication Data

US 2024/0125628 A1    Apr. 18, 2024

(30) Foreign Application Priority Data

Oct. 12, 2022    (GB) ...................................... 2215030

(51) Int. Cl.
G01D 5/353        (2006.01)
(52) U.S. Cl.
CPC ..... G01D 5/35361 (2013.01); G01D 5/35364 (2013.01)
(58) Field of Classification Search
CPC ........... G01D 5/35361; G01D 5/35364; G01N 2201/0886; G01N 2201/08; G01M 11/3109; G01M 11/30
See application file for complete search history.

(56) References Cited

U.S. PATENT DOCUMENTS 7,668,411 B2 * 2/2010 Davies ............... G01M 11/3109
385/12

2008/0100828 A1    5/2008 Cyr et al.
2012/0067118 A1 *  3/2012 Hartog .................... E21B 41/00
73/152.16

(Continued)

FOREIGN PATENT DOCUMENTS

CN        113432630 A      9/2021
EP         3640618 A1      4/2020

(Continued)

OTHER PUBLICATIONS

Xiaoyi Bao et al., "Recent Progress in Distributed Fiber Optic Sensors", Sensors, vol. 12, No. 12, Dec. 26 2012, pp. 8601-8639.

(Continued)

*Primary Examiner* — Tarifur R Chowdhury
*Assistant Examiner* — Carlos Perez-Guzman
(74) *Attorney, Agent, or Firm* — Mannava & Kang, P.C.

(57)        ABSTRACT

A distributed optical fibre sensor to measure one or more parameters of an environment as functions of position along a sensing optical fibre passing through the environment, and determines, measures or calculates an OTDR trace or attenuation profile of a sensing optical fibre in a distributed optical fibre sensor. The OTDR trace is to monitored to provide an indicia of properties of the sensing optical fibre in order to determine if the performance of the distributed optical fibre sensor in accurately measuring the desired environmental parameters is compromised. This allows adjustment of operation parameters of the distributed optical fibre sensor to maintain the performance at acceptable levels, or to automatically control the distributed optical fibre sensor in order to at least partly compensate for the changing properties. A distributed optical fibre sensor having such capability is also disclosed.

20 Claims, 3 Drawing Sheets

(56)                    References Cited

U.S. PATENT DOCUMENTS

| | | | | |
|---|---|---|---|---|
| 2020/0284647 | A1* | 9/2020 | Hveding | G01D 5/35361 |
| 2022/0390321 | A1* | 12/2022 | Leclerc | H04B 10/071 |

FOREIGN PATENT DOCUMENTS

| | | | |
|---|---|---|---|
| WO | 2006048647 | A2 | 5/2006 |
| WO | 2008056143 | A1 | 5/2008 |
| WO | 2010073002 | A1 | 7/2010 |
| WO | 2012063066 | A2 | 5/2012 |
| WO | 2013051196 | A1 | 4/2013 |
| WO | 2021152287 | A1 | 8/2021 |

OTHER PUBLICATIONS

Intellectual PropertyOffice, Search Report in UK Patent Application No. GB2215030.4, 4 pages, Mar. 31, 2023.

Kee, et al. An all-fiber system for simultaneous interrogation of distributed strain and temperature sensing using spontaneous Brillouin scattering Optics Letters, 2000, vol. 25, No. 10, pp. 698-697.

M.D. Mermelstein et al., "Rayleigh scattering optical frequency correlation in a single-mode optical fibre", Optics Letters vol. 26, Issue 2, Jan. 15, 2001, (Abstract Only).

Shimizu et al., "Characteristics and Reduction of Coherent Fading Noise in Rayleigh Backscattering Measurement for Optical Fibers and Components" Journal of Lightwave Technology vol. 10, Issue 7, Published Jul. 1992, (Abstract Only).

T. R. Parker, et al. 'Simultaneous Distributed Measurement of Strain and Temperature from Noise-Initiated Brillouin Scattering in Optical Fibers', IEEE Journal of Quantum Electronics, vol. 34, No. 4, Apr. 1998, (Abstract Only).

* cited by examiner

DISTRIBUTED OPTICAL FIBRE SENSOR

PRIORITY

This patent application claims priority under 35 U.S.C. 119 (a)-(d) to UK patent application number 2215030.4, having a filing date of Oct. 12, 2022, the disclosure of which is hereby incorporated by reference in its entirety.

The present disclosure relates to a distributed optical fibre sensor arranged to measure one or more parameters of an environment as functions of position along a sensing optical fibre that extends along a path through the environment

INTRODUCTION

Distributed optical fibre sensors are designed to acquire information about an environment within which a sensing optical fibre is deployed, in particular as parameters of the environment determined as functions of position along the optical fibre. These parameters are typically determined by launching pulses of probe light into the sensing optical fibre, and detecting characteristics of the probe light following elastic or inelastic backscatter from the native material of the sensing optical fibre to an interrogator. Various techniques are known for achieving this end, including the detection of coherent Rayleigh noise arising from small variations in refractive index along the sensing optical fibre and variations in that coherent Rayleigh noise over time due to vibrations, changes in pressure, strain or temperature, and so forth, as well as techniques such as the detection and use of Brillouin backscatter in determining temperature and strain at the sensing optical fibre, and therefore also the associated environmental parameters.

The invention seeks to address limitations of the related prior art.

SUMMARY OF THE INVENTION

The properties of the sensing optical fibre of a distributed optical fibre sensor can vary over time, for example due to degradation of the fibre itself under influences of heat, pressure and the chemical environment, damage to the fibre itself or connectors joining parts of the fibre together for example due to movements in the surrounding environment and the structures within which or to which the fibre is mounted. It would therefore be desirable to be able to monitor such properties in order to determine if the performance of the distributed optical fibre sensor in accurately measuring the desired environmental parameters is compromised, to manually adjust operation parameters of the distributed optical fibre sensor to maintain the performance at optimal levels, or to automatically control the distributed optical fibre sensor in order to at least partly compensate for the changing properties.

It would also be desirable to be able to determine such properties when a distributed optical fibre sensor is installed or commissioned so that relevant operating parameters can be adjusted manually or automatically in response to the determined properties. Relevant operating parameters which may be adjusted in response to determined properties of the sensing optical fibre may include duration and energy of probe light pulses, optical amplifier settings, and so forth.

In particular, an OTDR trace (optical time domain reflectometry trace) representing reflected power as received back at an interrogator provides a good indication of such properties, the level of received optical power from any particular location along the sensing optical fibre being due to several different processes including elastic and inelastic backscatter, attenuation of various types within the optical fibre, as well as localised or point reflectance and absorption of optical power for example a points of optical fibre damage or breaks, or at correctly functioning or compromised couplings. Such an OTDR trace may sometimes be referred to as an attenuation profile of the fibre.

The invention therefore provides methods for determining, measuring or calculating an OTDR trace or attenuation profile of a sensing optical fibre in a distributed optical fibre sensor, typically as a function of position along the sensing optical fibre, and corresponding apparatus such as a distributed optical fibre sensor within which such capability is implemented. The determined OTDR trace may then be used for example to determine or identify aspects of the sensing optical fibre which may affect the sensor performance such as changes in levels of attenuation across extended portions of the sensing optical fibre, and the appearance of or change in localised points of reflection of attenuation.

According to some aspects, the invention provides a method for determining an OTDR trace of a sensing optical fibre of a distributed optical fibre sensor, comprising reducing coherent Rayleigh noise in a reflected (including backscattered) power signal by one or both of: combining optical pulse backscatter samples for a particular location over a plurality of different pulse optical frequencies, and combining optical pulse backscatter samples over a plurality of overlapping spatial samples corresponding to the location, as well as corresponding apparatus.

Embodiments of the invention may employ a wavelength tuned probe light source combined with temporal/spatial oversampling of backscatter signals to reduce the effect of coherent Rayleigh noise in the OTDR trace measurement. Embodiments of the invention are described by illustration using Rayleigh scattering, but the same principles could be applied to other backscattering measurements where coherent Rayleigh noise contributes uncertainty to a measurement. The described techniques can avoid need for the use of separate optical systems for multiple optical measurements, in particular the separate measurements of an OTDR trace and measurements of parameters of an environment of the sensing optical fibre. Hardware costs can therefore be reduced by using the same components to implement the OTDR trace and parameter measurement interrogation functions. In addition, power supply, control and driver electronics can be integrated to support these multiple measurements.

By contrast, past examples of optical systems used to detect both Rayleigh and Brillouin scattering can be found where designers resorted to using combinations of light from different optical sources to implement measurements with both scattering mechanisms. In one instance, Kee et al., Optics Letters 25(1) 2000, used narrowband light from a semiconductor distributed feedback laser to allow Brillouin backscatter to be detected, combined with broadband light from a 0-switched fibre laser. Narrowband light is needed to allow detection of Brillouin backscatter because the wavelength offset between the Brillouin scatter and the source is typically only about 10 GHz, while several THz optical bandwidth was needed to minimise uncertainty in the Rayleigh measurements.

With this in mind, the invention also provides a method of operating a distributed optical fibre sensor to measure one or more parameters of an environment as functions of position along a sensing optical fibre that extends along a path through the environment, the method comprising:

using a probe light source of the distributed optical fibre sensor to generate first and second subsets of pulses of probe light; launching the first and second subsets of probe light pulses into the sensing optical fibre for backscatter within the sensing optical fibre;

receiving backscattered light from the sensing optical fibre at an optical detector of the distributed optical fibre sensor and electronically sampling the detector output to provide backscatter samples arising from each of the first and second subsets of probe light pulses;

calculating the one or more parameters of the environment as functions of position along the sensing optical fibre using the backscatter samples arising from the first subset of probe light pulses; and calculating an OTDR trace of the sensing optical fibre as a function of position along the sensing optical fibre using the backscatter samples arising from the second subset of probe light pulses.

In particular, in order to use the distributed optical fibre sensor to measure parameters of the environment using characteristics of the backscatter such as coherent Rayleigh noise or Brillouin backscatter, each probe light pulse may have a spectral bandwidth of less than 1 GHz and preferably less than 100 MHz. Note that this pulse bandwidth constrain may be imposed before the probe light pulse is launched into the sensing optical fibre for example by suitable arrangement and control of the probe light source, or after receipt but before detection of backscatter of the pulse, for example using suitable optical filters in the receiver. In order to benefit from combining both parameter and OTDR trace sensing within the same sensor, and for example using the same probe light source and/or laser to generate both the first and second subsets of probe light pulses, this pulse bandwidth constraint typically then applies to both the first and second subsets.

Note that although we refer to using samples of backscattered light to calculate the OTDR trace, these backscatter samples represent optical power returned to the detector through a variety of physical mechanisms, including elastic and inelastic scattering such as Rayleigh and Brillouin scattering within the material of the sensing optical fibre, attenuation and loss due to a variety of mechanisms, as well as localised or point reflectance and absorption of optical power for example at points of optical fibre damage or breakage, or at correctly functioning or compromised couplings located along the sensing optical fibre.

When we refer to backscattered light or probe light, and backscatter samples, it is therefore to be understood that these may arise from any or all of these and other mechanisms which affect the level of returned optical power received at the detector, even though it will usually be the case that the majority of the optical power received back at the detector is indeed due to Rayleigh backscatter within the native material of the sensing optical fibre.

The first and second subsets may be discrete and non-overlapping subsets of the probe light pulses, or some or all of the probe light pulses may be common to both of the first and second subsets.

If coherent Rayleigh noise in the backscattered probe light is used to detect the parameters of the environment, then these may for example comprise one or more of acoustic vibration, pressure, strain, and temperature. If Brillouin backscatter in the backscattered probe light is used to detect the parameters of the environment, then these may for example comprise one or more of temperature and strain.

Because of the above bandwidth constraint which is common to both the first and second subsets of probe light pulses, the second subset of pulses which are to be used to determine ab OTDR trace in the sensing optical fibre gives rise to significant coherent Rayleigh noise in the backscatter samples arising from backscatter of the second subset of probe light pulses. This coherent Rayleigh noise will typically make the calculated OTDR trace difficult to interpret or use unless the level of noise can be reduced. Note that simply using longer integration times over a larger number of probe light pulses is likely to be of little benefit because the pattern of coherent Rayleigh noise is typically quite stable.

According to a first mode of operation, therefore, the second subset of probe light pulses is generated so as to comprise at least one probe light pulse at each of a series of different pulse optical frequencies. Given a sufficient optical frequency change, the pattern of coherent Rayleigh noise also changes significantly, so that integrating the backscatter samples over multiple probe light pulses of different frequencies leads to a reduction in the level of coherent Rayleigh noise in the calculated OTDR trace.

Given that a single interference fringe arises from a change in pulse optical frequency of about twice the inverse of the pulse duration, the series of pulse optical frequencies may comprise optical frequencies spaced by at least 20%, or at least 40%, or at least 100% of the inverse of the pulse duration. In this way, the coherent Rayleigh noise signal arising from each pulse of different frequency is largely independent of and different to that arising from each of the other frequencies, so that combining backscatter signals arising from the different optical frequencies does lead to a useful reduction in coherent Rayleigh noise.

Note that although rather wider optical frequency spacings may be used, it may be advantageous to limit the size of each frequency spacing and the overall range of optical frequencies used in order to help maintain stability of the probe light source. Rapidly retuning a laser of the probe light source over larger optical frequency steps is likely to lead to poorer stability in terms of phase and frequency, even if the first subset of pulses is completely separate to the second subset, so is therefore liable to degrade the performance of the determination of the parameters of the environment. To this end, the optical pulse frequencies of the series may optionally be spaced from each other by no more than ten times or no more than twenty times the inverse of the pulse duration.

In practical terms for a useful distributed optical fibre sensor, the duration of each probe light pulses of the second subset may typically be from about 10 ns to 1000 ns, and the optical pulse frequencies of the series may typically be spaced by from about 1 MHz to 100 MHz. The series of pulse optical frequencies may typically comprise at least 10, or at least 100 different pulse optical frequencies. It is not necessary for all of the series of pulse optical frequencies to be evenly spaced, but typically the entire series may lie within a frequency range of, say, 10 MHz to 100 GHz.

Using the above series of pulse optical frequencies, the OTDR trace for a particular position or location or segment of the sensing optical fibre may be calculated by combining together, for example averaging, summing or integrating across, the backscatter samples which arise from the second subset of probe light pulses at each of the series of pulse optical frequencies, and which correspond to that particular position.

Undesirable levels of coherent Rayleigh noise in the backscatter samples arising from the second subset of probe light pulses may also or instead be addressed using a second mode of operation, wherein electronically sampling the detector output to provide backscatter samples arising from the second subset of probe light pulses comprises electronically sampling the detector output at a sampling interval which is less than 50% of, and preferably less than 20% of, or less than 10% of, the pulse duration. Oversampling in this way does not provide additional information about the state of the sensing optical fibre at a particular position, but it can be used to reduce coherent Rayleigh noise by ensuring that the oversampled backscatter samples have a degree of independence in terms of coherent Rayleigh noise, so that combining such backscatter samples has the desired effect.

The optical detector may be electronically sampled at a rate which is also higher than the electronic bandwidth of the optical detector.

Because of the physical length of each probe light pulse within the sensing optical fibre, each backscatter sample arises from backscatter within a segment of the sensing optical fibre which is at least half the physical length of the probe light pulse. If the sampling interval (inverse of sampling rate) is more than 50% of the pulse duration, these segments corresponding to subsequent samples are spatially separated, but when sampling with an interval which is less than 50% of the pulse duration the segments overlap, and adjacent samples no longer represent fully independent interferometric measurements of the state of the sensing optical fibre. However, such measurements will still generally comprise different and independent contributions of coherent Rayleigh noise.

Therefore, if using a sampling interval which is less than 50% of the pulse duration, the OTDR trace for a particular position may be calculated by combining together, for example summing, averaging or integrating across, multiple backscatter samples arising from the second subset of probe light pulses, where each such backscatter sample corresponds to a different sampled segment of the sensing optical fibre which is proximal to the particular position, where the sampled segments spatially overlap with each other.

To improve the reduction in coherent Rayleigh noise for calculating the OTDR trace, multiple backscatter samples which are all received at the optical detector within a time interval of at least half the pulse duration, or at least the pulse duration, or at least ten times the pulse duration, may be combined.

The two modes of operation above may be combined so that the OTDR trace for a particular position is calculated by combining both backscatter from multiple pulse frequencies, and from multiple overlapping segments through spatial oversampling. To this end, the OTDR trace for a particular position may be calculated by combining together backscatter samples arising from the second subset of probe light pulses corresponding to multiple different sampled segments of the sensing optical fibre which are overlapping and proximal to the particular position, and which include backscatter samples for each sampled segment which arise from probe light pulses of each of the series of pulse optical frequencies.

The calculated OTDR trace may be used in various ways, for example to automatically control operation of the distributed optical fibre sensor in response to the calculated OTDR trace. Such control could for example comprise controlling one or both of the probe light source, and a receiver comprising the detector, the receiver being arranged to receive and condition the received backscattered light for delivery to the detector, with this control being in response to the calculated OTDR trace or more particularly to a change in the OTDR trace in various ways, for example by operating the probe light source to vary or change duration of the probe light pulses of at least the first subset, by operating the probe light source, or more particularly a laser or an optical amplifier of the probe light source, to vary or change pulse energy of the probe light pulses of at least the first subset when launched into the sensing optical fibre, or by operating the receiver, or more particularly an optical amplifier of the receiver, so as to vary or change the energy of the backscattered light received at the detector, at least for backscattered light arising from probe light pulses of the first subset.

Such a change in the OTDR trace could be determined for example as one or more of: a determination of decreased reflected power; a determination of reflected power received from a predefined portion of the sensing optical fibre falling below a predefined threshold; a determination of increased reflected power; and a determination of reflected power received from a predefined portion of the sensing optical fibre rising above a predefined threshold.

The calculated OTDR trace could also or instead be used to compensate the calculation of the one or more parameters of the environment, for example to compensate this calculation and the resulting output parameters for changes in the calculated OTDR trace over time.

The invention also comprises apparatus arranged to put the described methods into effect, for example a distributed optical fibre sensor for measuring one or more parameters of an environment as functions of position along a sensing optical fibre that extends along a path through the environment, the distributed optical fibre sensor comprising:

a probe light source arranged to generate first and second subsets of pulses of probe light, each pulse having a spectral bandwidth of less than 1 GHz and preferably less than 100 MHz and having a pulse duration, the distributed optical fibre sensor being arranged to launch the first and second subsets of probe light pulses into the sensing optical fibre for backscatter within the sensing optical fibre;

a receiver comprising an optical detector, the receiver being arranged to receive and direct backscattered light from the sensing optical fibre to the optical detector and to electronically sample the detector output to provide backscatter samples arising from each of the first and second subsets of probe light pulses; and an analyser arranged to calculate the one or more parameters of the environment as functions of position along the sensing optical fibre using the backscatter samples arising from the first subset of probe light pulses, and to calculate an OTDR trace of the sensing optical fibre as a function of position along the sensing optical fibre using the backscatter samples arising from the second subset of probe light pulses.

Such apparatus can comprise the sensing optical fibre, although it may instead be provided as an interrogator or similar unit which can then be coupled to a suitable sensing optical fibre.

Aspects of the invention also provide the methods and apparatus outlined above and as described below, but where the purpose is to measure or calculate an OTDR trace but no measurement or calculation of parameters of the environment need be performed, in which case the sensing optical fibre may be referred to more simply as an optical fibre.

To this end, the invention also provides a method comprising: using a probe light source to generate pulses of probe light, each pulse having a spectral bandwidth of less than 1 GHz and optionally less than 100 MHz; launching the probe light pulses into an optical fibre for backscatter within the optical fibre; receiving backscattered light at an optical detector and electronically sampling the detector output to provide backscatter samples arising from the probe light pulses; and calculating an OTDR trace of the sensing optical fibre as a function of position along the sensing optical fibre using the backscatter samples arising from the second subset of probe light pulses. Either or both of the first and second modes of operation described herein can then also be used to reduce coherent Rayleigh noise in the measurements or calculations of the OTDR trace.

Where method or apparatus aspects are described which require data processing, these may be carried out by one or more suitable computer systems, and such computer systems may be located or distributed in various ways and not necessarily proximal to other aspects of the method or apparatus. To this end, the invention also provides one or more computer readable media comprising computer program code arranged to carry out any of the method steps described herein, and in particular aspects of those methods carried out by the analyser discussed below, and aspects of the controller.

Such computer program code may be executed on one or more suitable computer processors or computer systems. Generally also, the described methods may be implemented automatically, and without human intervention, using suitable control and/or computer systems.

For example, the calculation of one or more parameters of the environment along the sensing optical fibre using the backscatter samples arising from the first subset of probe light pulses, and the calculation of the OTDR trace, may be carried out by a suitable computer system implemented within the analyser discussed below or elsewhere.

BRIEF SUMMARY OF THE DRAWINGS

Embodiments of the invention will now be described, by way of example only, and with reference to the accompanying drawings of which.

DETAILED DESCRIPTION OF EMBODIMENTS

Figure 1:
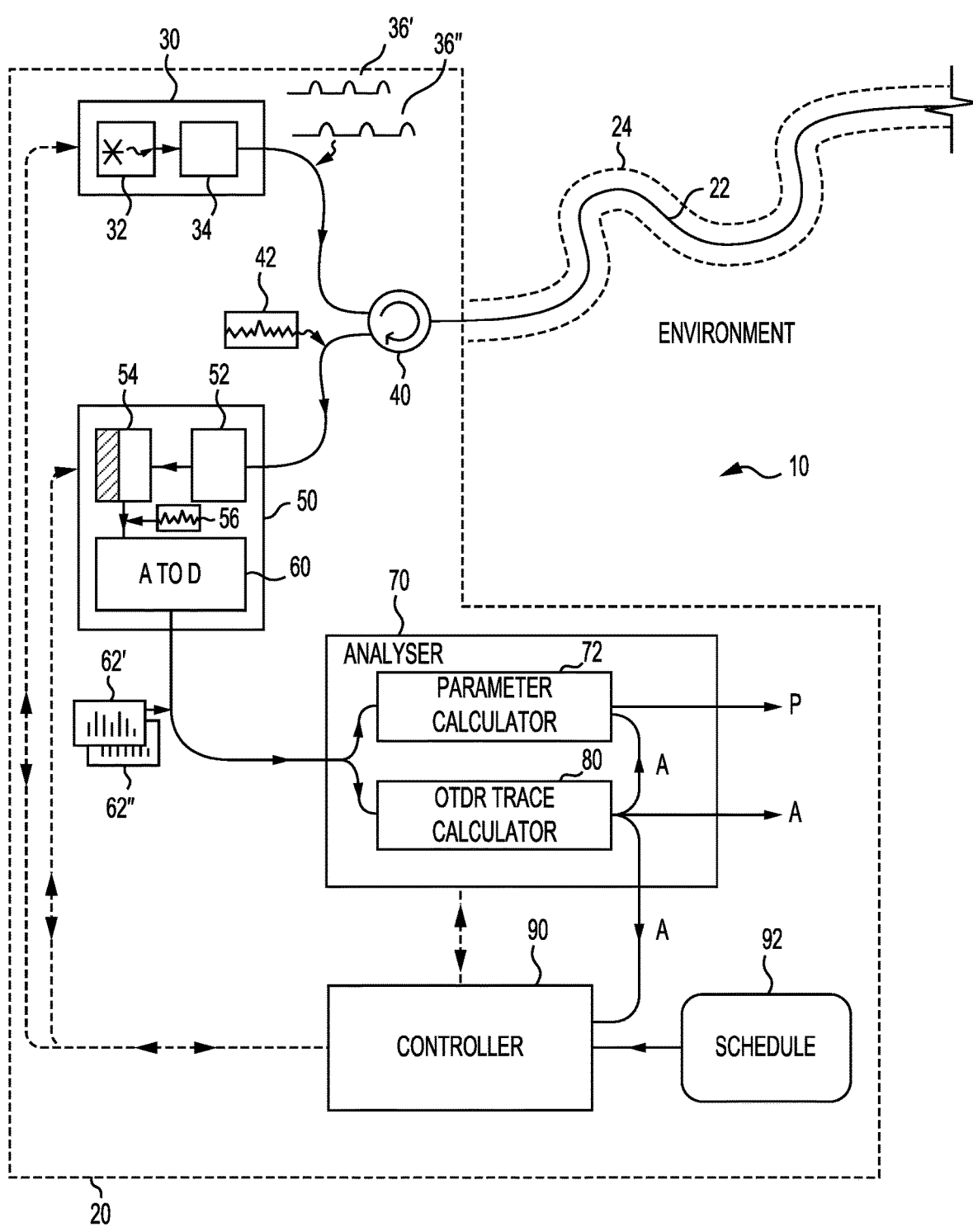
FIG. 1 shows schematically a distributed optical fibre sensor arranged to measure one or more parameters of an environment and an OTDR trace along the path of a sensing optical fibre.

Referring now to FIG. 1 there is shown a distributed optical fibre sensor 10 embodying the invention, and comprising an interrogator 20 coupled to a sensing optical fibre 22. The sensing optical fibre typical extends along a path 24 through an environment to be sensed, for example along a well bore, along a pipeline, through a building, around a security perimeter, or along a bridge, railway, fence, or other engineering structure.

The distributed optical fibre sensor is arranged to determine one or more parameters of the environment, as functions of position along the sensing optical fibre 22 and therefore also along the path 24. This is achieved by directing probe light into the sensing optical fibre, and receiving back from the sensing optical fibre 22 backscattered components of that probe light which have been backscattered within, and from the material of, the sensing optical fibre 22.

To this end, the interrogator 20 comprises a narrowband probe light source 30 typically comprising a laser 32 and optical conditioning elements 34 such as one or more amplification, attenuation, filtering, and/or polarisation control elements. The laser 32 of the probe light source 30 is used to generate probe light which is directed, following processing using the optical conditioning elements 34, to a circulator 40 which directs the probe light to the sensing optical fibre 22.

The probe light undergoes backscatter within the sensing optical fibre 22 due to various processes of scattering and reflection as discussed in more detail below, and is also subject to various absorption and loss processes, following which the backscattered probe light 42 is received back at the circulator 40 from where it is directed to a receiver 50 having a receiver bandwidth, the receiver being arranged to receive and electronically detect the backscattered probe light, and to electronically sample the resulting electronic signal. To this end, the receiver 50 typically comprises one or more optical conditioning elements 52 such as one or more amplification, attenuation, filtering, and/or polarisation control elements, and an optical detector 54 arranged to output an electronic signal 56 corresponding to the received and detected backscattered probe light.

Within the receiver 50, the electronic signal 56 from the optical detector is sampled by an analogue to digital converter 60 which outputs digital backscatter samples arising from the received backscattered light, and these backscatter samples are passed to an analyser 70. The analyser comprises a parameter calculator 72 which uses the backscatter samples to calculate the one or more parameters of the environment, which are then output as parameters P. Such parameters may be stored or displayed or used to generate alarms or other indicators at the interrogator 20 itself, or passed to a connected or remote device such as a personal computer or control panel for the environment being monitored by the sensor for the same purposes, or passed to a local or remote server for storage and/or further processing and use, or used in other ways.

In more detail, the probe light source 30 is used to generate discrete, short pulses of probe light for launching into the sensing optical fibre. Each probe light pulse is of sufficiently short duration, for example of the order of 100 ns, that optical time domain reflectometry can be used to relate the timing of the backscatter samples to particular positions along the sensing optical fibre 22. If each pulse has a duration of 100 ns, a spatial resolution of the optical time domain reflectometry and parameter detection of about 10 m can in principle be achieved. Pulse durations more generally in the range of about 10 ns to about 1000 ns may be appropriate, with the lower boundary of this range being partly constrained by a requirement for also generating a pulse with a sufficiently narrow bandwidth to yield sufficient coherent Rayleigh noise as discussed below, as well as by a constraint of needing sufficient signal to noise ratio in the detector for measurements of required time resolution.

The probe light pulses may be generated by using a pulsed laser for the laser 32, but more typically may be generated by using a continuous wave laser for the laser 32 in combination with an optical gating element, such as a semiconductor optical amplifier or an acousto-optic switch, for defining the pulses from the output of the laser 32. Such an optical gating element may typically form part of the optical conditioning elements 34. The length of each pulse may then be increased or decreased as required, for example as discussed below in response to changes in a determined OTDR trace, by suitable control of the probe light source 30 or more particularly of the optical gating element. The power of probe light pulses launched into the sensing optical fibre may also be controlled or changed, independently of the pulse duration if needed, for example in response to changes in a determined OTDR trace, by suitable control of the probe light source for example by control of the laser source or an optical amplifier of the probe light source.

Each probe light pulse also has a sufficiently narrow spectral bandwidth that the optical detector 54 detects significant coherent Rayleigh noise in the time dependent intensity of the backscattered probe light, and therefore leading to significant coherent Rayleigh noise in the time series of the backscatter samples output by the analogue to digital converter 60. Coherent Rayleigh noise arises from self-interference of the probe light within the sensing optical fibre 22 at a particular backscatter position or segment along the fibre, and consists of irregular fringes of higher and lower intensity over time arising due to variations in the refractive index along the sensing optical fibre 22.

The spectral bandwidth of each launched probe light pulse could for example be around 10 MHz, although spectral bandwidths down to around 1 MHz, or up to about 1 GHz, or even up to about 10 GHz may be used. Note that when we refer to the spectral bandwidth of a launched probe light pulse, it is to be noted that this may also refer to the corresponding situation in which probe light pulses of higher bandwidth, optionally much higher bandwidth, are launched into the sensing optical fibre 22, and the bandwidth of the backscattered light is constrained to the desired narrow spectral bandwidth for example as discussed above, following receipt of the backscattered light back at the interrogator. This can be achieved for example by use of a suitable narrow band optical filter within the receiver 50.

The duration of each of the launched probe light pulses can be controlled automatically by a controller 90 which is arranged to provide suitable control of the probe light source 30. The controller 90 is also able to control automatically the optical frequency of the probe light pulses, for example to implement a first mode of operation as described below in which multiple probe light pulse frequencies are used to improve measurements of an OTDR trace A. The controller 90 may operate according to a schedule 92 which dictates when and how the sensor operates to detect parameters P, and when and how the sensor operates to detect a sensing optical fibre OTDR trace A, both discussed in more detail below.

The probe light pulses generated by the probe light source 30 may be divided into first and second subsets 36' and 36" of probe light pulses, typically (but not necessarily) generated and launched into the sensing optical fibre at different times, for example with a series of pulses of the first subset 36' alternating with a series of pulses of the second subset 36". The first subset 36' of pulses then gives rise to first backscatter samples 62', and the second subset 36" gives rise to second backscatter samples 62", so that each of the first and second subsets of probe light pulses, and therefore each of the groups of first and second backscatter samples, can be used for a different purpose.

In particular, the first backscatter samples 62' arising from the first subset 36' of probe light pulses may be used by the parameter calculator 72 to calculate the one or more parameters of the environment as functions of position along the sensing optical fibre 22, using the coherent Rayleigh noise signal present in the backscatter samples 62'. This technique of using coherent Rayleigh noise for optical fibre sensing is often described as phase sensitive OTDR, because each discrete segment of the sensing optical fibre of similar length to a probe light pulse acts as an interferometer. The coherent Rayleigh noise in the electronic signal 56 and corresponding backscatter samples 62' is then related to the optical path length of that interferometer, which can vary for example due to local changes in temperature and strain of the sensing optical fibre 22 which reflect corresponding parameters of the environment to be sensed.

Using such phase sensitive OTDR techniques, parameters such as acoustic vibration, static pressure, temperature, and strain may be calculated by the analyser 70 and output as one or more parameters P. For example see the discussions in WO2012/063066 and WO2021/152287 each of which is herein incorporated by reference for these and all other purposes. In some arrangements the spectral bandwidth of each probe light pulse may be as high as 100 GHz, for example see WO2008/056143 which is herein incorporated by reference for these and all other purposes. A simple, single pulse shape may be used for each probe light pulse, or more complex pulse forms such as a double pulse may be used, for example see WO2006/048647 which is herein incorporated by reference for this and all other purposes.

If each subsequent one of the probe light pulses is of the same optical frequency as the previous pulse, then to avoid overlap at the detector of the backscatter with subsequent pulses, a full round trip delay to the end of the sensing optical fibre and back to the detector is needed between the launching of each pulse. However, if pulses of different optical frequencies are used then a more rapid launching of pulses can be used without such detector overlap, for example as described in WO2012/063066, which is herein incorporated by reference for these and all other purposes.

Although the parameters of the environment may be calculated using the coherent Rayleigh noise in the electronic signal 56 as represented by the first backscatter samples 62' arising from the first subset of probe light pulses, other techniques may instead be used to determine one or more of the parameters P. For example, the receiver 50 may be used to detect one or more spectral features arising from Brillouin scattering of the first subset 36' of probe light pulses within the sensing optical fibre 22. Detecting one or more such spectral features could be carried out at the receiver 50 using a spectrometer, or using one or more specific spectral filters, and such spectral features could for example comprise the positions or intensities of one or more spectral peaks, or spectral intensities at particular wavelengths.

The one or more Brillouin spectral features may then be sampled using the analogue to digital converter 60 to provide the first backscatter samples 62' arising from the first subset of probe light pulses, which are then passed to the analyser 72 to determine the one or more parameters of the environment. Some examples of how Brillouin spectral features may be used in this way to detect parameters such as temperature and strain are given in T. R. Parker, M. Farhadiroushan, R. Feced, V. A. Handerek and A. J. Rogers 'Simultaneous Distributed Measurement of Strain and Temperature from Noise-Initiated Brillouin Scattering in Optical Fibers', IEEE Journal of Quantum Electronics, Vol. 34, No. 4, April 1998, p. 645-659.

Note that because Brillouin spectral shifts are small, of the order of around 10 GHz, the requirement for the probe light pulses to be of narrow bandwidth is still present to enable relevant Brillouin spectral features to be detected, with a probe light pulse bandwidth of about 10 MHz being typical, and of the order of 100 MHz to about 1 GHz being reasonably practical.

The distributed optical fibre sensor 10 may also or instead use various other techniques for measuring the one or more parameters of the environment as functions of position along the sensing optical fibre, for example optical frequency domain reflectometry and similar techniques.

Attenuation of the sensing optical fibre 22, as a function of position along the sensing optical fibre, leads to diminishment of the relatively high initial intensity of the probe light pulses as they travel away from the interrogator 20, and diminishment of the already much lower intensity of backscattered light as it travels back towards the interrogator 20. In this respect, attenuation may be understood as attenuation at around the frequency or frequencies of the probe light pulses being used by the sensor. Attenuation of the sensing optical fibre as a function of position may therefore be of interest for example during set up or commissioning of the sensor 10, and/or over subsequent extended periods of operation of the sensor for example over days to years. For example, the attenuation at a time of commissioning may be used to adjust initial settings of the sensor such as optical amplifier gains and pulse durations, and also to either manually or automatically adjust such settings during extended periods of operation as further discussed below.

The attenuation of the sensing optical fibre may change for example due to gradual degradation of the sensing fibre or its cladding, along the full length or in zones where conditions are more harsh or cabling carrying the fibre is less effective, due to increased attenuation at connectors or splices, due to complete fibre breaks or failure of connectors, and so forth.

Other processes also lead to changes in the intensity of probe light travelling in each direction along the sensing optical fibre, including elastic and inelastic scattering within the native material of the sensing optical fibre, other low level loss processes, and point or localised reflectance and loss mechanisms at fibre defects, damage or breaks, and at correctly functioning or compromised couplings.

These attenuation and other processes give rise to variations in the total reflected power received back at the interrogator, and this may be represented as an OTDR trace, as a function of position along the sensing optical fibre. Essentially, this is a curve or trace of the backscattered power received back at the interrogator 20, or reflected signal power in dB, over twice the time interval for a probe light pulse to arrive at a far end of the optical fibre. A conventional instrument arranged to use optical time domain reflectometry (OTDR) to measure such an OTDR trace as a function of position may be coupled to the sensing optical fibre 22 of FIG. 1, in parallel with the interrogator 20, in order to make such measurements, but this is likely to require either periodic installation and removal of such an instrument, or permanent installation of such equipment, either of which may be inconvenient and expensive.

In order to determine an OTDR trace as a function of position with a good signal to noise ratio, prior art OTDR trace instruments use probe light pulses with a very high bandwidth, of the order of THz. These high bandwidths lead to close to complete suppression of any coherent Rayleigh noise which would be present in the backscatter signal if rather smaller pulse bandwidths were used.

However, the inventors have determined that a distributed optical fibre sensor such as that illustrated in FIG. 1, in which narrow bandwidth probe light pulses are used to measure one or more parameters of an environment as functions of position along a sensing optical fibre, can also be used to provide an effective and useful OTDR trace if certain additional measures are taken.

To this end it will be noted that in FIG. 1, and as already discussed above, the narrowband probe light pulses are provided as first and second subsets 36' and 36" of such pulses, and that the first subset 36' is used in the measurement of the one or more parameters P through the use of the corresponding first backscatter samples 62'. The second subset 36" of probe light pulses gives rise to second backscatter samples 62" which are passed to an OTDR trace calculator 80 of the analyser 70 for the calculation of an OTDR trace of the sensing optical fibre as a function of position along the sensing optical fibre, for output as OTDR trace A. The calculated OTDR trace may be represented in various forms, for example as received backscattered power, a local attenuation rate, or in other ways, and as described later may also be used for automatic control of the sensor. As for the parameters P discussed above, the OTDR trace A may be stored or displayed or used to generate alarms or other indicators at the interrogator 20 itself, or passed to a connected or remote device such as a personal computer or control panel for the environment being monitored by the sensor for the same purposes, or passed to a local or remote server for storage and/or further processing and use, or used in other ways.

Two principal modes of operation for obtaining a OTDR trace A will now be described, either of which can be used alone, or both can be used in combination, and either or both of which can be implemented in the arrangement of FIG. 1.

In a first of these modes, the second subset 36" of probe light pulses is generated so as to comprise at least one probe light pulse at each of a series of different pulse optical frequencies. The OTDR trace for a particular position can then be calculated by combining together, for example by summing or averaging in some other way, backscatter samples 62" which arise from probe light pulses having each of the series of pulse optical frequencies. In order to achieve an improved OTDR trace efficiently, it is desirable to choose the optical frequencies so as to increase or maximise the independence of the corresponding backscatter samples from each other, for example by selection of a suitable frequency step to be used between the frequencies of the series.

Figure 2:
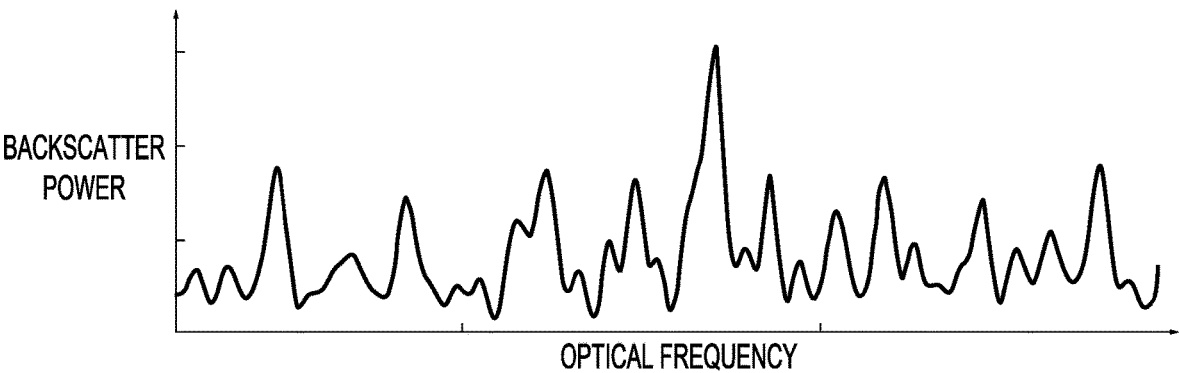
FIG. 2 demonstrates how backscattered optical power from a particular position along the sensing optical fibre may change as the optical frequency of the probe light is changed.

FIG. 2 illustrates how the backscattered optical power from a particular position along the sensing optical fibre may change as the optical frequency of the probe light pulses change. In generating this data, the pulses used each had a duration of about 100 ns and an optical bandwidth of about 10 MHz.

The characteristic size of the interference fringes of the coherent Rayleigh noise for a particular position along the sensing optical fibre as the optical frequency of the probe light changes is determined essentially by the optical pulse duration. From basic interferometer principles, if the pulse duration is $t_p$, and the optical frequency of the pulse is v, then the interferometer phase change $\Delta\varnothing$ under a change in optical frequency $\Delta v$ can be written as:

$$\Delta\varnothing = \pi t_p \Delta v$$

In the experiment of FIG. 2 therefore, a single fringe ($\Delta\Pi = 2\pi$) will therefore correspond to a frequency change of about 20 MHz.

The effect of the coherent Rayleigh noise on the received backscattered power can therefore be reduced by generating probe light pulses at a series of frequencies spaced so that around two to five frequencies are found within the typical optical frequency range corresponding to one fringe, so with a spacing of around 50% down to 20% of the change in optical frequency corresponding to a single fringe, which corresponds to a spacing of 100% of the inverse of the pulse duration down to 40% of the inverse of the pulse duration. More broadly, in order to obtain a higher number of independent measures of backscattered power using a lower number of frequency steps, the frequencies of the series may have a spacing of at least about 20%, or at least about 40%, or at least about 100% of the inverse of the pulse duration. In practice, the smaller frequency steps used at the lower end of this range will permit the laser source 30 and the laser 32 itself to return to a stable state more quickly between retuning than for larger steps, but the spacing between the steps could be much larger. As a practical matter, it may be desirable to set an upper limit on the spacing between the frequencies of the series to about ten times that corresponding to a single fringe, so about twenty times the inverse of the pulse duration.

It has also been proposed, for example in M. D. Mermelstein et al., "*Rayleigh scattering optical frequency correlation in a single-mode optical fibre*", Optics Letters 26(2) 2001, that independent measures of backscattered power are obtained when the optical frequency of the probe light pulses is changed by an amount equal to the inverse of the pulse duration. This corresponds to the optical frequencies of the series having a spacing of 100% of the inverse of the pulse duration. For example, for probe light pulses of 100 ns duration, giving a spatial resolution for parameter sensing of about 10 m in the sensing optical fibre, a series of optical frequencies spaced by about 10 MHz may be used. Of course, as discussed above, the optical frequencies may be separated by smaller spacings than this 100% of the inverse of the pulse duration and still provide useful coherent Rayleigh noise reduction.

Figure 3:
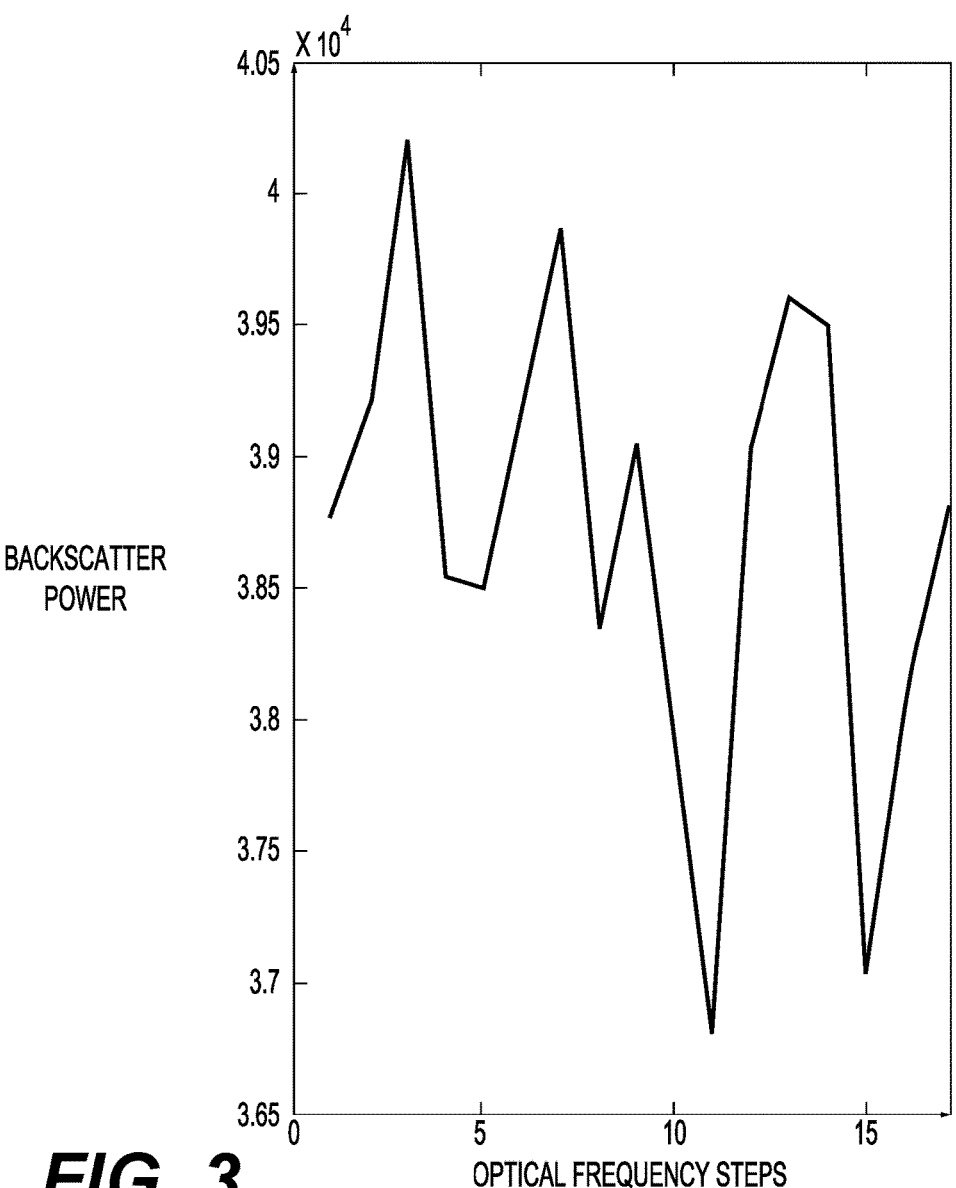
FIG. 3 depicts optical frequency steps which may be used to implement a first mode of operation of the sensor for measuring an OTDR trace.

FIG. 3 illustrates a series of optical frequencies which can be used for the second subset of light pulses 36", in which 16 different frequencies are used with a frequency step corresponding to about four frequencies per fringe. For a pulse duration of 100 ns, this corresponds to a frequency step of about 5 MHz. More generally, for typical use in an optical fibre sensor using coherent Rayleigh noise for parameter detection, and using probe light pulses having a duration of from 10 ns to 1000 ns, suitable frequency steps may lie in a range from about 1 MHz to 100 MHz.

The number of different optical frequencies used for the second subset of probe light pulses may be chosen according to the time available within the operation of the sensor for OTDR trace measurements, with larger numbers of frequencies giving rise to improved OTDR trace measurements due to a higher degree of averaging of the coherent Rayleigh noise. Typically, at least 10, or at least 100 different frequencies may be used, depending on need. Note that although we refer to a series of optical frequencies, it is not necessary for the optical source to tune to these different frequencies in the strict order of the series, i.e. monotonically increasing or decreasing in frequency, although that may be the most efficient implementation in many cases. Furthermore, it is not necessary for the optical frequencies used for the second subset of probe light pulses to be evenly spaced, although again, this may be the most efficient implementation in many cases.

This first mode of operation can be implemented by suitable operation of the controller 90 to cause the probe light source 30 to generate probe light pulses of suitable optical frequencies as discussed above, as well as suitable pulse durations and timings. Corresponding operation of OTDR trace calculator 80 can then be used to calculate a measure of backscatter with reduced coherent Rayleigh noise, and therefore OTDR trace A, for a particular position along the sensing optical fibre including by combining together backscatter samples arising from each of the different optical frequencies for that position, for example by summing, averaging, or in some other way.

The OTDR trace A can be output simply as the reduced noise measure of received backscatter, or one or more further processing steps such as differentiation and low pass filtering may be used. The results from a plurality of pulses of each optical frequency of the series may be combined to further reduce noise in the output OTDR trace A, for example by transmitting one pulse of each optical frequency in series, then repeating the frequency series a number of times.

The schedule 92 used by controller 90 may dictate when probe light pulses of the second subset for OTDR trace measurement are generated, for example in a block during a period of measurement of only the OTDR trace, or interspersed with probe light pulses of the first subset for the purposes of parameter measurement.

In the second of the modes of operation for obtaining an OTDR trace, the analogue to digital converter 60 is arranged to electronically sample the output of the optical detector, for at least the second subset 36" of probe light pulses, at a rate which is significantly higher than that required to correspond to the spatial resolution of the sensor as dictated by the pulse duration. In this way multiple backscatter samples, each of which corresponds to a different sampled segment of the sensing optical fibre, where these segments overlap and are all proximal to a position where an OTDR trace value is to be measured, can be combined together to form an OTDR trace value at the position corresponding to the overlapping segments, for example at an average or central position of the spatially overlapping, or oversampled segments.

For example, if the pulse duration is 100 ns then this corresponds to a physical length of the pulse in the optical fibre of about 20 metres and a spatial resolution of the sensor of about 10 metres. Using a sampling interval of half the pulse duration, so in this case 50 ns (20 MHz rate), is then sufficient to achieve the spatial resolution of 10 metres dictated by the pulse duration. In this second mode of operation the analogue to digital converter 60 instead electronically samples the output of the detector at a higher rate than this, in particular using a sampling interval (inverse of the sampling rate) of less than 50%, or less than 20%, or less than 10% of the pulse duration, thereby generating multiple backscatter samples corresponding to overlapping sampled segments of the fibre, which correspond to spatial positions which are closer together than the spatial resolution dictated by the pulse duration. For a 100 ns pulse these percentages correspond to a sampling interval of less than 50 ns (greater than 20 MHz), less than 20 ns (greater than 50 MHz), or less than 10 ns (greater than 100 MHz).

If the coherence length of the probe light source 30 is long compared with the duration of each probe light pulse, then if operating within the electronic bandwidth of the detector, this oversampling still yields backscatter samples which are independent in terms of the measured coherent Rayleigh noise, so which can be combined, summed or otherwise averaged to obtain a better OTDR trace. To this end, the oversampling may be carried out at a rate which is higher than the electronic bandwidth of the detector, and can usefully be carried out at a rate of up to twice the electronic bandwidth before the benefits of still higher rates of sampling are lost.

If the electronic bandwidth of the optical detector is 85 MHz for example, then the detector output can be oversampled at up to twice this rate, so up to about 170 MHz to still yield independent measurements of the coherent Rayleigh noise.

The number of spatially overlapping or oversampled backscatter samples which are combined together by the OTDR trace calculator 80 for calculating the OTDR trace A in this second mode of operation may vary in order to achieve a balance between spatial resolution and accuracy of the OTDR trace measurement. For example, it will usually be desirable to combine together multiple backscatter samples corresponding to light received at the detector over an interval of at least half a pulse duration (so over 50 ns for a 100 ns pulse) which achieves a maximum spatial resolution based on the pulse duration, but larger numbers of spatially overlapping backscatter samples for example measured over a total time interval of at least the pulse duration, or at least ten times the pulse duration may be used.

This second mode of operation can be implemented by suitable operation of the controller 90 to ensure a suitable rate of sampling by the analogue to digital converter 60 as specified above, and operation of the OTDR trace calculator 80 to combine a series of consecutive backscatter samples arising from backscatter of a probe light pulse of the second subset to yield a measure of backscatter with reduced coherent Rayleigh noise, and therefore of OTDR trace A, for the position corresponding to the combined backscatter samples. Where the backscatter samples are combined from an extended region of the sensing optical fibre, for example over tens or even hundreds of metres, a suitable position for the reflected power or OTDR trace value may be taken for example to be a central point of the source of backscatter for those backscatter samples.

Combination of a series of consecutive backscatter samples may be achieved for example by summing, or averaging the samples in some other way.

For the second mode of operation described above, the OTDR trace A can be output simply as the reduced noise measure of received backscatter, or one or more further processing steps such as differentiation and low pass spatial filtering may be used. The results from a plurality of pulses may be combined to further reduce noise in the output OTDR trace.

The schedule 92 used by controller 90 may dictate when probe light pulses of the second subset for OTDR trace measurement are generated for use in this second mode of operation, for example in a block during a period of measurement of only the OTDR trace, or interspersed with probe light pulses of the first subset for the purposes of parameter measurement.

Although the first and second modes of operation for generating the OTDR trace A are described separately above, the two may readily be combined, by forming the second subset using probe light pulses of multiple different optical frequencies as described in respect of the first mode of operation, and also spatially oversampling the backscatter from each such probe light pulse as described in respect of the second mode of operation. The OTDR trace is then calculated by combining, for example summing or otherwise averaging, a series of backscatter samples corresponding to multiple different but overlapping sampled segments of the sensing optical fibre which correspond to or are proximal to the particular position, where the combined backscatter samples include backscatter samples for each sampled segment which arise from probe light pulses of each of the series of pulse optical frequencies.

In this way, backscatter samples arising from both multiple different pulse frequencies, and from multiple oversampled spatial locations are combined to further reduce coherent Rayleigh noise in the measure of backscatter so as to better approximate the desired OTDR trace.

Figure 4:
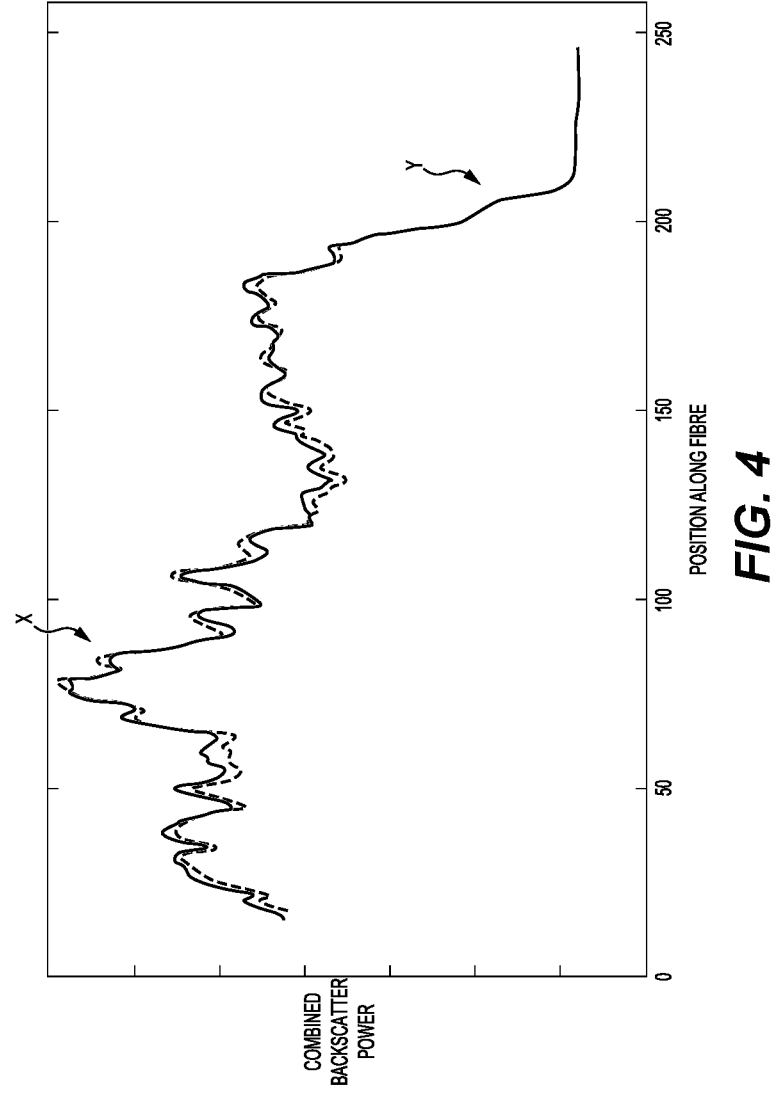
FIG. 4 is a plot of backscatter power providing an OTDR trace along the sensing optical fibre for the sensor operating in combined first and second modes of operation.

FIG. 4 shows the results of such a combined operation, in this case using second subset probe light pulses of 100 ns duration. In the solid (largely upper) curve, probe light pulses of sixteen different optical frequencies having a series spacing of about 10 MHz were used to implement the first mode of operation, and spatial oversampling of each of these frequencies was used according to the second mode of operation to provide fifteen backscatter samples for each frequency from overlapping segments of the fibre at a sampling rate of 150 MHz. A series of fifteen overlapping sample segments then corresponds to a practical spatial resolution of about 10 m. The backscatter samples from the fifteen spatial samples at each of the sixteen optical frequencies were then combined or averaged to yield a measure of received backscattered optical power with reduced coherent Rayleigh noise, which can then be used to provide the OTDR trace A.

In FIG. 4 a single combined measure of received backscattered optical power is shown for each of about 200 fibre positions spaced by 10 metres, through use of overlapping backscatter samples for adjacent fibre positions. It can be seen that the level of coherent Rayleigh noise has been reduced sufficiently for the effect of a reflective fibre connector at point X to be visible in the OTDR trace. The end of the fibre is at about fibre position 210 at point Y.

In FIG. 4 a dashed (largely lower) curve shows the corresponding measurements where only four different optical frequencies were used in the second subset of probe light pulses.

Shimizu et al., Jnl. Lightwave Technology 10(7) 982-987 (1992) considered properties of coherent fading noise in Rayleigh backscattering measurements for optical fibres. On the basis of their analysis, we can provide some examples of suitable probe light pulse and electronic sampling parameters for implementing the arrangements described above such as that of FIG. 1. In a case of an interrogator 20 using a pulse duration of 100 ns and a series of pulse optical frequencies over a scanned range of 100 MHz, it can be calculated that the best accuracy for the OTDR trace A is expected to be about 0.44 dB. In order to achieve this performance, about 20 different optical frequencies spaced at about 5 MHz may be used.

If this performance was deemed inadequate, then for the same pulse duration of 100 MHz, increasing the scanned optical frequency range to about 3.5 GHz would improve the OTDR trace accuracy to about 0.08 dB. In this case, probe light pulses at about 700 different optical frequencies, again separated by 5 MHz steps, would be suitable. Generating and measuring backscatter from probe light pulses of such a large series would extend the measurement time considerably. However, since statistically independent estimates of the backscatter intensity within the spatial resolution length can be found by spatial oversampling as explained earlier, and it is well known that the error in a measurement reduces in proportion to the square root of the number of independent estimates, using an electronic sampling rate of 150 MHz instead of the 10 MHz required to achieve the intrinsic spatial resolution of the sensor, in combination with a series of 20 optical frequencies over a frequency range of 100 MHz, would reduce the OTDR trace measurement error due to coherent Rayleigh noise from 0.44 dB to 0.12 dB, now very similar to the wider frequency range result, but with a thirty five times reduction in measurement time.

In practice, the reduction in measurement time could be even greater for some laser types that allow relatively rapid tuning over a narrow frequency range by adjusting the laser drive current, but require much longer delays when tuning across wider ranges by taking advantage of much slower thermal effects.

As noted above, the controller may operate according to a schedule 92 which comprises data which dictates when and how the sensor operates to detect parameters P, and when and how the sensor operates to measure the OTDR trace A. In some arrangements for example, the interrogator may operate in a parameter measurement mode PM for extended periods, during which one or more parameters P are repeatedly determined through backscatter of probe light pulses of the first subset, and then only occasionally operate in an OTDR trace measurement mode AM in which the OTDR trace A is measured using probe light pulses of the second subset, and only then for a short interval. For example, the schedule may dictate that the PM mode operates continuously except for a single period each day within which a single or a limited number of repeated measurements in the AM mode are made at a particular time each day, for example for 30 seconds at 00:00 midnight.

In other arrangements if required, the AM mode may be used more frequently for example several times a day, every hour or every minute.

In other arrangements, the PM mode and AM mode may be intermingled more closely, for example with a single or multiple AM mode probe light pulses of one particular optical frequency being followed by one or more PM mode pulses, before a further single or multiple AM mode probe light pulses of a further, different frequency being used.

In other arrangements, the PM mode and AM mode may use shared probe light pulses, so that the first and second subsets of probe light pulses overlap or are congruent. For example, the interrogator could effectively use some or all of the first subset of probe light pulses both for measuring the one or more parameters P, and for measuring the OTDR trace A. In the first mode of operation in which multiple optical frequencies are used for measuring the OTDR trace with reduced coherent Rayleigh noise, some or all of the same multiple optical frequencies may be used for measuring the one or more parameters. In the second mode of operation in which spatial oversampling is used for measuring the OTDR trace with reduced coherent Rayleigh noise, the spatial oversampling may be used with suitable regard to the actual positions of the segments of the sensing optical fibre from which the backscatter samples are derived to combine these backscatter samples for measurement of the one or more parameters.

The schedule 92 may also set particular optical frequency tuning parameters (for example frequency spacing and/or overall range) for controlling the first mode of operation, particular spatial oversampling parameters (for example sampling interval or rate and number of samples to combine) for controlling the second mode of operation, particular pulse durations, and other parameters of operation, for controlling the sensor at particular times, for example to implement the PM and AM modes outlined above.

In the AM mode in particular, such parameters may be set in the schedule 92, or varied for example under control of the schedule, depending on whether the objective is to achieve a higher level of spatial resolution of the OTDR trace, a lower level of coherent Rayleigh noise in the OTDR trace, a lower measurement time of the OTDR trace, or some compromise between these aspects.

Spatial resolution can be increased by reducing the pulse duration, or by reducing the number of overlapping segment samples to combine and/or increasing the sampling rate under the second mode of operation, but all of these measures are likely to lead to increases in coherent Rayleigh noise. Coherent Rayleigh Noise can be reduced by increasing the pulse duration but potentially at the expense of spatial resolution, or by increasing the number or range of different pulse frequencies under the first mode of operation but at the expense of measurement time.

To this end, the schedule 92 may for example provide parameters for the controller 90 to implement three different resolution schemes for OTDR trace measurement as follows:

a high spatial resolution scheme with a higher number and/or larger range of optical frequencies under the first (multiple frequency) mode of operation, and combining a low number of spatially overlapping samples under the second (spatial oversampling) mode of operation, useful to provide improved spatial detail in the OTDR trace for the location or analysis of discrete reflection or loss points;

a medium spatial resolution scheme using a more moderate number and/or range of optical frequencies under the first mode of operation, and combining an increased number of overlapping spatial samples under the second mode of operation, useful for acquiring OTDR traces for use in sensor installation and commissioning; and a low spatial resolution scheme using a low number of optical frequencies under the first mode of operation, and combining a relatively high number of spatial samples under the second mode of operation, useful for periodic background monitoring of the sensor during normal operation.

As mentioned above, as well as being provided as an output for a user or operator to inspect and make use of, for example at a display of the interrogator 20 or of a separate or remote personal computer or control panel, the calculated or measured OTDR trace A may be also or instead be used for automatic control of the sensor. In the arrangement of FIG. 1 this may conveniently be carried out by the calculated OTDR trace A being provided to either or both the controller 90 and the parameter calculator 72.

If the OTDR trace A is provided to the controller 90, the controller in turn may use this information to control operating parameters of the probe light source 30. For example, in order to provide optimised measurement of the one or more parameters P, carefully optimised control of the probe light source 30 may be required. If coherent Rayleigh noise is being used to measure the parameters as described above, such optimizations may include a balance of aspects such as:

maintaining the shortest practical pulse duration in order to achieve the highest available spatial resolution, while permitting longer pulse durations where higher levels of reflected power are required in order to achieve adequate signal to noise ratios especially for distant positions of the sensing optical fibre;

maintaining the lowest practical energy of pulses output by a laser of the probe light source in order to maximise the stability of the laser in terms of frequency stability, but more particularly phase stability which may particularly be required for coherent Rayleigh noise phase based parameter measurements, while permitting higher pulse energies if required in order to achieve adequate signal to noise ratios especially for some positions along the sensing optical fibre;

maintaining the lowest practical gain for any particular optical amplifier in one or both of the probe light source 30 and the receiver 50 in order to maximise the stability of the amplifier and its output, while permitting higher amplified pulse energies if required in order to achieve adequate signal to noise ratios especially for distant positions of the sensing optical fibre.

To this end, the controller may be arranged to control operation of the distributed optical fibre sensor in response to the calculated OTDR trace A, for example a change in the OTDR trace determined by the controller or other parts of the interrogator, in various ways such as:

operating the probe light source to vary or change duration of the probe light pulses of at least the first subset, for example to increase duration in response to a reduction in reflected power;

operating the probe light source, for example a laser or an optical amplifier of the probe light source, to vary or change pulse energy of the probe light pulses of at least the first subset as launched into the sensing optical fibre, for example to increase pulse energy in response to a reduction in reflected power; or operating the receiver, for example an optical amplifier of the receiver, so as to vary or change the energy of the backscattered light received at the detector, at least for backscattered light arising from probe light pulses of the first subset, for example to increase the energy of the backscattered light received at the detector in response to a reduction in reflected power.

As mentioned above, duration of the probe light pulses may typically be changed by suitable control of an optical gating element of the probe light source 30. Pulse energy may typically be changed using such an optical gating element, or a separate optical amplifier of the probe light source 30, or in other ways.

Determination of changes in the OTDR trace in response to which such control steps are implemented may for example be a determination of decreased or increased reflected power, whether from along the whole, some arbitrary or some particular length of the sensing optical fibre, or a determination of the reflected power falling below or rising above a particular or predefined threshold, for example a determination of reflected power from a predefined portion such as an end of the sensing optical fibre falling below a predefined threshold. Other determined changes may be the appearance or increase in strength of a strong reflection in the OTDR trace, for example resulting from a failing connector or from localised damage to the sensing optical fibre.

If the OTDR trace A is provided to the parameter calculator, then aspects of or changes in the calculated OTDR trace may be used to adjust how one or more parameters P are calculated from backscattered light arising from the first subset of probe light pulses. For example, changes in the OTDR trace for one or more particular portions or all of the sensing optical fibre could be used to trigger changes in the processing of the backscatter samples 62' of the first probe light pulse 36' by the parameter calculator 72, for example to increase or decrease spatial and/or time averaging or integration, to adjust digital filtering of the data for example over space and/or time, or to adapt processes of the parameter calculator which recover time dependent phase changes from the backscatter samples.

In the described arrangements, a number of functional elements have been described which carry out data processing activities, especially the analyser 70 and the controller 90. Although illustrated as being located in particular physical and/or logical relationships to each other and other aspects of the embodiments, computer implemented functionality of such elements can of course be located and distributed in various ways for example in or between various computer systems and in various locations, with such computer systems being suitably linked using data network connections and the like.

Such computer systems will typically comprise one or more suitable microprocessors, associated memory, suitable input and output facilities, network connections and so forth. Where methods relating to data analysis are described herein, these will typically be implemented using computer program software executing on such computer systems, and the invention extends to such computer programs comprising software instructions, as well as to one or more computer readable media carrying such computer programs.

Although various embodiments of the invention have been described with reference to the drawings, the skilled person will be aware that various modifications and changes may be made to these embodiments without departing from the scope of the invention. For example, although embodiments have been described in which one or more parameters of an environment are calculated from backscatter of a first subset of probe light pulses, and an OTDR trace or attenuation profile is calculated from backscatter of a second subset of probe light pulses, in some arrangements no first subset of pulses is used and no calculation of parameters is carried out, so that the invention then provides a method or apparatus for determining or calculating an OTDR trace or attenuation profile of an optical fibre using sampled backscatter from narrow band probe light pulses launched into the optical fibre.

The invention claimed is:

1. A method of operating a distributed optical fibre sensor to measure one or more parameters of an environment as functions of position along a sensing optical fibre that extends along a path through the environment, comprising:

using a probe light source to generate first and second subsets of probe light pulses, wherein the second subset of probe light pulses comprises pulses having different frequencies;

launching the first and second subsets of probe light pulses into the sensing optical fibre for backscatter within the sensing optical fibre;

receiving, from the sensing optical fibre, a first backscattered light arising from the first subset of probe light pulses and a second backscattered light arising from the second subset of probe light pulses;

sampling, by an analog to digital converter, the received first backscattered light to provide first backscatter samples arising from the first subset of probe light pulses and sampling the received second backscattered light to provide second backscatter samples arising from the second subset of probe light pulses having the different frequencies, wherein the first backscatter samples arising from the first subset of probe light pulses and the second backscatter samples arising from the second subset of probe light pulses are used for different purposes, including the first backscatter samples being used for parameter measurement, and the second backscatter samples being used for optical time domain reflectometry (OTDR) trace measurement;

calculating, by a parameter calculator, the one or more parameters of the environment as functions of position along the sensing optical fibre using the first backscatter samples arising from the first subset of probe light pulses; and calculating, by an OTDR trace calculator, an OTDR trace of the sensing optical fibre as a function of position along the sensing optical fibre using the second backscatter samples arising from the second subset of probe light pulses having the different frequencies.

2. The method of claim 1, wherein the first backscatter samples arising from the first subset of probe light pulses represent coherent Rayleigh noise in the first backscattered light arising from the first subset of probe light pulses, and the one or more parameters of the environment comprise one or more of acoustic vibration, pressure, strain, and temperature.

3. The method of claim 1, wherein the first backscatter samples arising from the first subset of probe light pulses represent Brillouin backscatter in the first backscattered light arising from the first set of probe light pulses, and the one or more parameters of the environment comprise one or more of temperature and strain.

4. The method of claim 1, wherein the second subset of probe light pulses having the different frequencies comprises at least one probe light pulse at each of a series of pulse optical frequencies.

5. The method of claim 4, wherein the optical pulse frequencies of the series are spaced by at least 20% of an inverse of a pulse duration.

6. The method of claim 4, wherein the optical pulse frequencies of the series are spaced by no more than twenty times an inverse of a pulse duration.

7. The method of claim 4, wherein a duration of each probe light pulse of the second subset is from 10 ns to 1000 ns, and the optical pulse frequencies of the series are spaced by from 1 MHz to 100 MHz.

8. The method of claim 4, wherein the series of pulse optical frequencies comprises at least 10 different pulse optical frequencies.

9. A distributed optical fibre sensor for measuring one or more parameters of an environment as functions of position along a sensing optical fibre that extends along a path through the environment, comprising:

a probe light source arranged to generate first and second subsets of pulses of probe light, wherein the second subset of probe light pulses comprises pulses having different frequencies, and wherein the first and second subsets of probe light pulses are launched into the sensing optical fibre for backscatter within the sensing optical fibre;

a receiver comprising an optical detector, the receiver being arranged to receive and direct a first backscattered light corresponding to the first subset of probe light pulses and a second backscattered light corresponding to the second subset of probe light pulses to the optical detector and to electronically sample the first backscattered light to provide first backscatter samples arising from the first subset of probe light pulses and sample the second backscattered light to provide second backscatter samples arising from the second subset of probe light pulses having the different frequencies, wherein the first backscatter samples arising from the first subset of probe light pulses and the second backscatter samples arising from the second subset of probe light pulses are used for different purposes, including the first backscatter samples being used for parameter measurement, and the second backscatter samples being used for optical time domain reflectometry (OTDR) trace measurement; and an analyzer comprising a parameter calculator arranged to calculate the one or more parameters of the environment as functions of position along the sensing optical fibre using the first backscatter samples arising from the first subset of probe light pulses, and an OTDR trace calculator arranged to calculate an OTDR trace of the sensing optical fibre as a function of position along the sensing optical fibre using the second backscatter samples arising from the second subset of probe light pulses having the different frequencies.

10. The distributed optical fibre sensor of claim 9, wherein the first backscatter samples arising from the first subset of probe light pulses represent coherent Rayleigh noise or Brillouin backscatter in the first backscattered light arising from the first subset of probe light pulses, and the one or more parameters of the environment comprise one or more of acoustic vibration, pressure, strain and temperature.

11. The distributed optical fibre sensor of claim 9, wherein the second subset of probe light pulses comprises at least one probe light pulse at each of a series of pulse optical frequencies.

12. The distributed optical fibre sensor of claim 11, wherein the probe light pulses of the second subset have a pulse duration from 10 ns to 1000 ns, and an optical frequency spacing between the probe light pulses of the second subset is from 1 MHz to 100 MHz.

13. The distributed optical fibre sensor of claim 11, wherein the OTDR calculator is arranged to calculate the OTDR trace for a particular position along the sensing optical fibre by combining together the second backscatter samples which arise from the second subset of probe light pulses at each of the series of pulse optical frequencies, and which correspond to that particular position.

14. The distributed optical fibre sensor of claim 9, wherein the receiver is arranged to electronically sample the second backscattered light corresponding to the second subset of probe light pulses at a sampling interval less than 50% a pulse duration of the probe light pulses of the second subset.

15. The distributed optical fibre sensor of claim 9, wherein the OTDR trace calculator is arranged to calculate the OTDR trace for a particular position by combining together the second backscatter samples arising from the second subset of probe light pulses, the second backscatter samples corresponding to a plurality of different sampled segments of the sensing optical fibre which are spatially overlapping and proximal to the particular position.

16. The distributed optical fibre sensor of claim 15, wherein the OTDR trace for the particular position is calculated by combining together the second backscatter samples which are all received at the optical detector within a time interval of at least half the pulse a duration of the probe light pulses of the second subset.

17. The distributed optical fibre sensor of claim 9, wherein the OTDR trace calculator is arranged to calculate the OTDR trace for a particular position by combining together the second backscatter samples arising from the second subset of probe light pulses having the different frequencies corresponding to multiple different sampled segments of the sensing optical fibre which are overlapping and proximal to the particular position, and which include backscatter samples of each of the series of pulse optical frequencies.

18. The distributed optical fibre sensor of claim 9, further comprising:

a controller arranged to control operation of the distributed optical fibre sensor responsive to the calculated OTDR trace.

19. The distributed optical fibre sensor of claim 9, further comprising the sensing optical fibre.

20. A method of determining an optical time domain reflectometry (OTDR) trace of a sensing optical fibre of a distributed optical fibre sensor, comprising:

launching, from a probe light source, a first subset and a second subset of probe light pulses into the sensing optical fibre, wherein the second subset of probe light pulses comprises pulses having different frequencies;

receiving, by a receiver, from the sensing optical fibre, a first backscattered light corresponding to the first subset of probe light pulses and a second backscattered light corresponding to the second subset of probe light pulses;

sampling, by a converter, the received first backscattered light to provide first backscatter samples arising from the first subset of probe light pulses, wherein the first backscatter samples are used for parameter measurement;

sampling, by the converter, the received second backscattered light to provide second backscatter samples arising from the second subset of probe light pulses having the different frequencies, wherein the second backscatter samples are used for OTDR trace measurement;

calculating, by a parameter calculator, parameters of the environment as functions of position along the sensing optical fibre using the first backscatter samples arising from the first subset of probe light pulses; and calculating, by an OTDR trace calculator, an OTDR trace of a particular position along the sensing optical fibre using the second backscatter samples arising from the second subset of probe light pulses having the different frequencies.

* * * * *